Mar. 27, 1923. 1,449,669.
P. W. GROSSMAN.
GRAVITY LEVEL.
FILED FEB. 20, 1922.
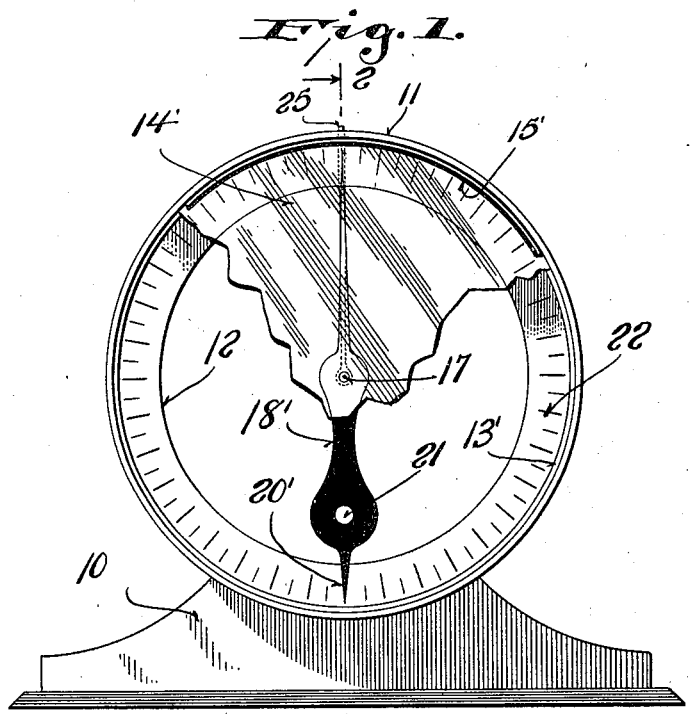
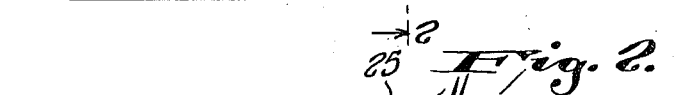
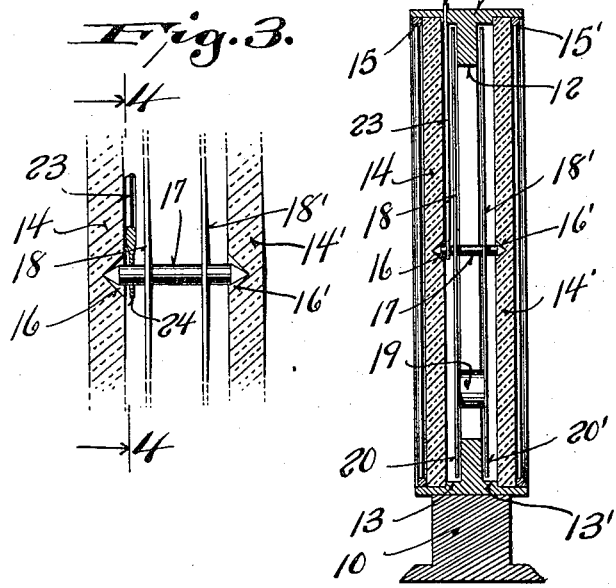
Inventor:
Philip W. Grossman Patented Mar. 27, 1923.

1,449,669

UNITED STATES PATENT OFFICE.

PHILIP W. GROSSMAN, OF MILWAUKEE, WISCONSIN.

GRAVITY LEVEL.

Application filed February 20, 1922. Serial No. 537,847.

*To all whom it may concern:*

Be it known that I, PHILIP W. GROSSMAN, a citizen of the United States, and resident of Milwaukee, in the county of Milwaukee and State of Wisconsin, have invented certain new and useful Improvements in Gravity Levels; and I do hereby declare that the following is a full, clear, and exact description thereof.

The invention relates to a gravity level. Hitherto, inconvenience and delay has been occasioned because of the tendency of the indicator in a level to oscillate for some time before coming to rest.

Applicant's invention comprises an indicator, a cylinder, a pair of glass discs in the cylinder encasing the indicator, and a brake having an end projecting through the cylinder and manually actuable to check the oscillations of the indicator.

A primary object of the invention is the provision of a brake which is conveniently digitally manipulable so as to cause the indicator to remain stationary with respect to the scale, thus enabling the entire level to be removed from the work to which it was applied so that the position of the pointer on the scale may be ascertained.

A further object of the invention is the provision of braking means which will not interfere with the normal oscillation of the indicator so that the sensitiveness of the device is not affected.

A still further object is the provision of a level which may be read from either of the two sides and which comprises an indicator made of two similar needles which are easily assembled and may be retained frictionally in position.

With the above and other objects in view which will appear as the description proceeds, my invention resides in the novel construction, combination and arrangement of parts substantially as hereinafter described and more particularly defined by the appended claims, it being understood that such changes in the precise embodiment of the herein disclosed invention may be made as come within the scope of the claims.

In the accompanying drawing, I have illustrated one complete example of the physical embodiment of the present invention constructed according to the best mode I have so far devised for the practical application of the principles thereof, and in which:—

Figure 1 is a side view of the invention.

Figure 2 is a cross section thereof on the line 2—2 of Figure 1.

Figure 3 is an enlarged detail showing the pivot, and

Figure 4 is a cross section on the line 4—4 of Figure 3.

Base 10 having a flat lower surface adapted to contact with the work is secured to cylinder 11 from which annular flange 12 is inwardly directed. Spaced on either side from flange 12 are shoulders 13, 13' against which circular glass discs 14, 14' contact, being secured in position by annuli 15, 15'. Glass discs 14, 14' are provided with recesses 16, 16', receiving the ends of pivot 17 to which needles 18, 18' are frictionally and detachably secured. Weight 19 spaces the lower points 20, 20' of the needles apart, said needles being apertured to receive studs 21 on weight 19. This construction facilitates assembly of parts. Flange 12 is provided on either face with a scale 22. Rod 23 extends into an aperture in cylinder 11 and is provided with an eye 24 receiving pivot 17.

When base 10 is applied to the work, the movement of the device causes an oscillation of needles 18, 18'. Obviously in a sensitive instrument this is protracted. Until the parts become motionless, a reading of the point on the scales is prevented. To bring the parts to rest quickly, the finger is applied to end 25 of the rod and eye 24 is brought into contact with pivot 17 and thus frictionally operates to check the movement of the needles. The pressure on rod 23 may then be released and pivot 17 is freed for oscillation. On each depression of end 25 the amplitude of vibration is limited. Thus the process by which the level comes to rest is considerably expedited.

The weight of rod 23 is negligible and consequently does not operate by friction of eye 24 to impede the free movement of pivot 17 so that the sensitiveness of the instrument is in no wise impaired.

When the needles are at rest the finger may be applied to end 25 of the rod and the level may be removed from the work for observation of the reading, which is visible from two sides.

I claim:—

1. The combination of an indicator, a pair of glass plates supporting said indicator and permitting the pivotal movement thereof, a scale, means supporting said plates and scale, and braking means manually operable to check oscillation of said indicator.

2. The combination of a base member having a flat working face, a cylindrical member, having an annular flange projecting inwardly therefrom, and annular shoulders spaced slightly from said flange, a pair of circular glass discs contacting with said shoulders and having recesses, means for securing said discs in position, a pivot having its ends resting in said recesses, a pair of needles having their ends extending over said flange, said flange having scales on its opposite faces, said needles being frictionally secured to said pivot so as to turn therewith, a slidably mounted rod having an eye enveloping said pivot, one end of said rod extending through an opening in said cylinder, and a weight spacing said needles apart and secured thereto.

In testimony that I claim the foregoing I have hereunto set my hand at Milwaukee, in the county of Milwaukee and State of Wisconsin.

PHILIP W. GROSSMAN.